(12) United States Patent
Ko et al.

(10) Patent No.: US 7,409,599 B2
(45) Date of Patent: Aug. 5, 2008

(54) METHOD OF VERIFYING DEFECT MANAGEMENT AREA INFORMATION OF OPTICAL DISC UPON INITIALIZATION WITHOUT CERTIFICATION AND TEST APPARATUS FOR PERFORMING THE SAME

(75) Inventors: Jung-wan Ko, Yongin (KR); Hyun-kwon Chung, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 10/792,744

(22) Filed: Mar. 5, 2004

(65) Prior Publication Data

US 2004/0174783 A1 Sep. 9, 2004

Related U.S. Application Data

(63) Continuation of application No. 09/805,436, filed on Mar. 14, 2001, now Pat. No. 6,782,493.

(60) Provisional application No. 60/195,468, filed on Apr. 10, 2000.

(30) Foreign Application Priority Data

Apr. 8, 2000 (KR) .................................. 00-18501

(51) Int. Cl.
*G06F 11/00* (2006.01)
(52) U.S. Cl. ..................... 714/42; 369/53.1; 369/53.12; 369/53.15; 369/53.44
(58) Field of Classification Search ........................ None
See application file for complete search history.

(56) References Cited

U.S. PATENT DOCUMENTS

| 4,631,723 A | 12/1986 | Rathburn et al. |
| 5,237,553 A | 8/1993 | Fukushima et al. |
| 5,568,454 A | 10/1996 | Shima et al. |
| 5,966,358 A | 10/1999 | Mine |

(Continued)

FOREIGN PATENT DOCUMENTS

CN 1227950 9/1999

(Continued)

OTHER PUBLICATIONS

OSTA.MultiRead2: Test Plan for MultiRead2. Dec. 6, 1999. pp. 1-14.*

(Continued)

*Primary Examiner*—Yolanda L Wilson
(74) *Attorney, Agent, or Firm*—Stein, McEwen & Bui, LLP

(57) ABSTRACT

A method of verifying defect management area (DMA) information of an optical disc upon initialization without certification, and a test apparatus for performing the same. The method includes generating as test information, defect management information, which is generated after performing initialization without certification on a blank test disc to which no data is written, and verifying the test information using reference test information for the initialization without certification to provide a test result. Accordingly, it can be easily verified that a recording and reproducing apparatus properly translates and processes DMA information which is generated after initialization without certification, using a blank test disc.

21 Claims, 6 Drawing Sheets

U.S. PATENT DOCUMENTS

| | | | |
|---|---|---|---|
| 6,088,664 | A | 7/2000 | MacPherson |
| 6,154,858 | A | 11/2000 | Ottesen et al. |
| 6,467,054 | B1 | 10/2002 | Lenny |
| 6,526,522 | B1 | 2/2003 | Park et al. |
| 6,542,450 | B1 | 4/2003 | Park |
| 6,564,345 | B1 | 5/2003 | Kim et al. |
| 2003/0133379 | A1 | 7/2003 | Park |
| 2003/0135800 | A1 | 7/2003 | Kim et al. |

FOREIGN PATENT DOCUMENTS

| | | |
|---|---|---|
| EP | 0 281 408 | 9/1988 |
| EP | 1 043 723 | 10/2000 |
| JP | 07-57397 | 3/1995 |
| JP | 10-144011 | 5/1998 |
| JP | 2000-040308 | 2/2000 |
| WO | WO 01/22416 | 3/2001 |

OTHER PUBLICATIONS

MultiRead2: Test Plan for MultiRead2 (Optical Storage Technology Association)(Rev. 1.0) (Dec. 6, 1999).

U.S. Appl. No. 09/805,443, filed Mar. 14, 2001, Jung Wan Ko et al., Samsung Electronics Co., Ltd.
U.S. Appl. No. 09/805,437, filed Mar. 14, 2001, Jung Wan Ko et al., Samsung Electronics Co., Ltd.
U.S. Appl. No. 09/805,446, filed Mar. 14, 2001, Jung Wan Ko et al., Samsung Electronics Co., Ltd.
U.S. Appl. No. 09/805,447, filed Mar. 14, 2001, Jung Wan Ko et al., Samsung Electronics Co., Ltd.
U.S. Appl. No. 09/805,439, filed Mar. 14, 2001, Jung Wan Ko et al., Samsung Electronics Co., Ltd.
U.S. Appl. No. 09/805,438, filed Mar. 14, 2001, Jung Wan Ko et al., Samsung Electronics Co., Ltd.
U.S. Appl. No. 09/805,448, filed Mar. 14, 2001, Jung Wan Ko et al., Samsung Electronics Co., Ltd.
U.S. Appl. No. 09/805,444, filed Mar. 14, 2001, Jung Wan Ko et al., Samsung Electronics Co., Ltd.
U.S. Appl. No. 09/805,436, filed Mar. 14, 2001, Jung Wan Ko et al., Samsung Electronics Co., Ltd.
"ECMA: Standarizing Information and Communication Systems: 120mm DVD Rewritable Disk (DVD-RAM)," Standard ECMA-272, 2nd edition, Jun. 1999, pp. 1-99.

* cited by examiner

FIG. 2

| Class | Items | | Byte Position | of bytes | Expected value |
|---|---|---|---|---|---|
| DMA | Error condition of DMA | DMA1 | NA | NA | No uncorrectable error |
| | | DMA2 | NA | NA | No uncorrectable error |
| | | DMA3 | NA | NA | No uncorrectable error |
| | | DMA4 | NA | NA | No uncorrectable error |
| | DDS/PDL and SDL Update counters | DDS/PDL update counter in DDS1 | 4 to 7 | 4 | M+k |
| | | DDS/PDL update counter in SDL1 | 16 to 19 | 4 | M+k |
| | | DDS/PDL update counter in DDS2 | 4 to 7 | 4 | M+k |
| | | DDS/PDL update counter in SDL2 | 16 to 19 | 4 | M+k |
| | | DDS/PDL update counter in DDS3 | 4 to 7 | 4 | M+k |
| | | DDS/PDL update counter in SDL3 | 16 to 19 | 4 | M+k |
| | | DDS/PDL update counter in DDS4 | 4 to 7 | 4 | M+k |
| | | DDS/PDL update counter in SDL4 | 16 to 19 | 4 | M+k |
| | | SDL update counter in SDL1 | 4 to 7 | 4 | N+k |
| | | SDL update counter in SDL2 | 4 to 7 | 4 | N+k |
| | | SDL update counter in SDL3 | 4 to 7 | 4 | N+k |
| | | SDL update counter in SDL4 | 4 to 7 | 4 | N+k |
| | Contents of DMA | DMA1 | NA | | Should be identical |
| | | DMA2 | NA | | Should be identical |
| | | DMA3 | NA | | Should be identical |
| | | DMA4 | NA | | Should be identical |

FIG. 3

| Class | Items | | Byte Position | of bytes | Expected value | |
|---|---|---|---|---|---|---|
| DDS | DDS Identifier | | 0 to 1 | 2 | 0A0Ah | |
| | reserved | | 2 | 1 | 00h | |
| | Disc Certification flag | | 3 | 1 | b7 | 0b |
| | | | | | b6-b2 | All 0b |
| | | | | | b1 | 0b |
| | | | | | b0 | 0b |
| | DDS/PDL update counter | | 4 to 7 | 4 | M+k | |
| | Number of Groups | | 8 to 9 | 2 | 0001h | |
| | Number of zones | | 10 to 11 | 2 | 0023h | |
| | reserved | | 12 to 79 | 68 | All 00h | |
| | Location of Primary spare area | | 80 to 87 | 8 | b63-b56 | 00h |
| | | | | | b55-b32 | 031000h |
| | | | | | b31-b24 | 00h |
| | | | | | b23-b0 | 0341FFh |
| | Location of LSN0 | | 88 to 91 | 4 | b31-b24 | 00h |
| | | | | | b23-b0 | - |
| | reserved | | 92 to 255 | 164 | All 00h | |
| | Start LSN for each zone | Zone1 | 256 to 259 | 140 | b31-b24 | 00h |
| | | Zone2 | 260 to 263 | | b23-b0 | - |
| | | ... | ... | | b31-b24 | 00h |
| | | | | | b23-b0 | - |
| | | | | | ... | ... |
| | | Zone34 | 392 to 395 | | b31-b24 | 00h |
| | | | | | b23-b0 | - |
| | reserved | | 396 to 2047 | 1652 | All 00h | |

FIG. 4

| Class | Items | | Byte Position | of bytes | Expected value | |
|---|---|---|---|---|---|---|
| PDL | PDL Identifier | | 0 to 1 | 2 | 0001h | |
| | Number of entries in PDL | | 2 to 3 | 2 | $E_{PDL}$ | |
| | Integrity of PDL entries | First PDL entry | 4 to 7 | 4 | b31-b30 | |
| | | | | | b23-b0 | |
| | | Second PDL entry | 8 to 11 | 4 | b31-b30 | |
| | | | | | b23-b0 | |
| | | ... | ... | ... | ... | ... |
| | | Last PDL entry | n to n+3 | 4 | b31-b30 | |
| | | | | | b23-b0 | |
| | Size of PDL | | | | $4 \times E_{PDL}+4$ | |
| | Un-used area | | n+4 to 30719 | | FFh | |

FIG. 5

| Class | Items | | Byte Position | of bytes | Expected value | |
|---|---|---|---|---|---|---|
| SDL | SDL identifier | | 0 to 1 | 2 | 0002h | |
| | reserved | | 2 to 3 | 2 | 00h | |
| | SDL Update counter | | 4 to 7 | 4 | N+k | |
| | Start sector number of SSA | | 8 to 11 | 4 | b31-b24 | 00h |
| | | | | | b23-b0 | - |
| | Total number of logical sectors | | 12 to 15 | 4 | | |
| | DDS/PDL Update counter | | 16 to 19 | 4 | M+k | |
| | Spare area full flag | | 20 | 1 | b7-b2 | All 0b |
| | | | | | b1 | - |
| | | | | | b0 | - |
| | reserved | | 21 | 1 | 00h | |
| | Number of entries in SDL | | 22 to 23 | 2 | $E_{SDL}$ | |
| | Integrity of SDL entries | First SDL entry | 24 to 31 | 8 | b63-b56 | 00h |
| | | | | | b55-b32 | |
| | | | | | b23-b0 | |
| | | Second SDL entry | 32 to 39 | 8 | b62 | |
| | | | | | b55-b32 | |
| | | | | | b23-b0 | |
| | | ... | ... | ... | ... | ... |
| | | Last SDL entry | m to m+7 | 8 | b62 | |
| | | | | | b55-b32 | |
| | | | | | b23-b0 | |
| | | Size of PDL | | | $8 \times E_{SDL}+24$ | |
| | | Un-used SDL area | m+8 to 32767 | | FFh | |

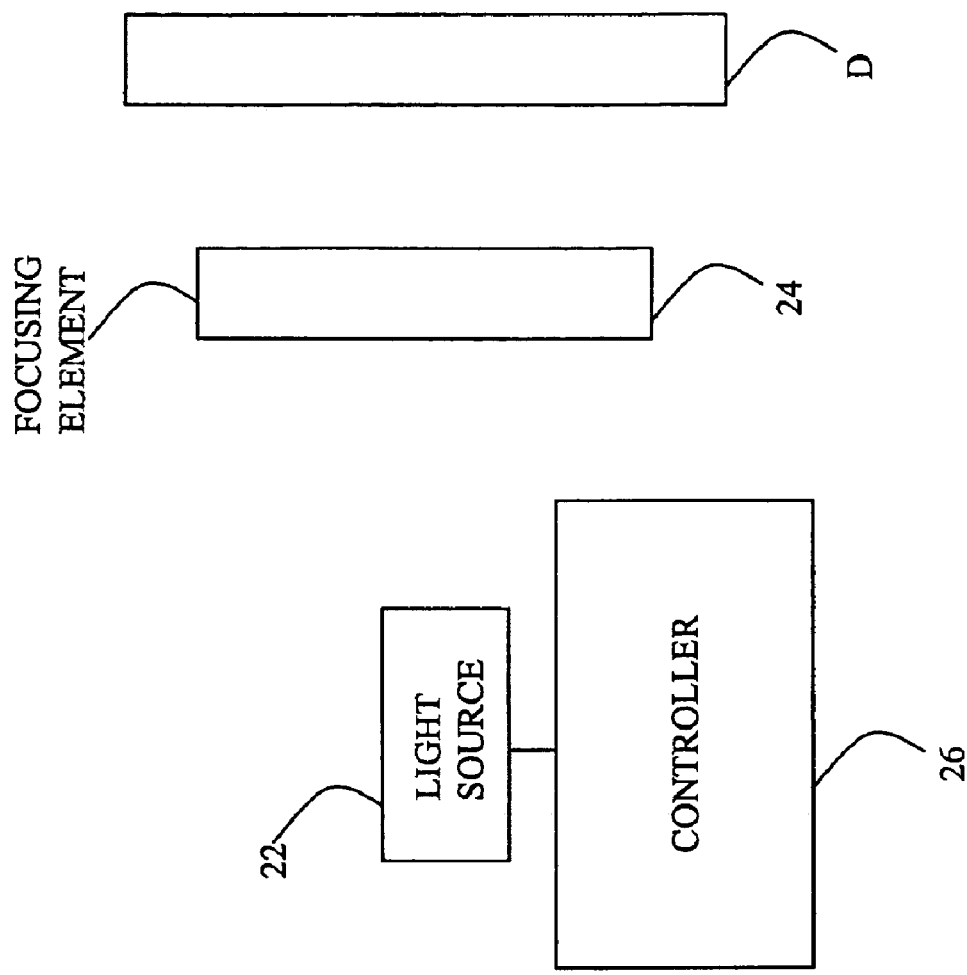

METHOD OF VERIFYING DEFECT MANAGEMENT AREA INFORMATION OF OPTICAL DISC UPON INITIALIZATION WITHOUT CERTIFICATION AND TEST APPARATUS FOR PERFORMING THE SAME

CROSS-REFERENCE TO RELATED APPLICATIONS

This application is a continuation of U.S. patent application Ser. No. 09/805,436, filed Mar. 14, 2001 now U.S. Pat. No. 6,782,493 and currently pending, which claims the benefit of Korean Application No. 00-18501, filed Apr. 8, 2000, in the Korean Patent Office and U.S. Provisional Application No. 60/195,468, filed Apr. 10, 2000, the disclosures of which are incorporated herein by reference.

BACKGROUND OF THE INVENTION

1. Field of the Invention

The present invention relates to optical disc recording and reproducing technology, and more particularly, to a method of verifying defect management area information of a recordable and reproducible optical disc upon initialization without certification, and a test apparatus for performing the same.

2. Description of the Related Art

Digital versatile disc-random access memory (DVD-RAM) discs have a defect management function of replacing defective areas with normal recordable areas, and storing information necessary for the defect management in a portion referred to as a defect management area (DMA) thereon. DMA information is repeatedly recorded in four portions on a disc: two portions in a lead-in area and two portions in a lead-out area. DMA information is composed of a disc definition structure (DDS), a primary defect list (PDL) and a secondary defect list (SDL).

DMA information includes information on a spare area and important information on the start logical sector number of each zone, in addition to information on defects, which are detected during certification performed while a disc is being initialized or during use of a disc.

Some information included in the DMA can be immediately read and used. On the other hand, the DMA includes information, which varies with the positions and the number of defects on a disc. That is, some information, for example, the position information of the start logical sector number of each zone or the position information of a first logical sector number, can be obtained only by performing complex computation according to a given algorithm based on defect information registered in the DMA.

Since such DMA information is closely related to a physical data recording position, a recording medium such as an optical disc, which can be used in a given recording and reproducing apparatus even if DMA information on the disc has been generated or updated in another recording and reproducing apparatus, may not be compatible with both recording and reproducing apparatuses when the DMA information is wrong. To overcome this problem, an apparatus and method of verifying that a recording and reproducing apparatus correctly reads DMA information from a disc and correctly records DMA information on the disc is desired.

SUMMARY OF THE INVENTION

To solve the above problem, a first object of the present invention is to provide a method of verifying that defect management area (DMA) information is correctly generated upon initialization without certification in an optical disc recording and reproducing apparatus.

A second object of the present invention is to provide a method of verifying that DMA information is correctly generated upon initialization without certification in a recording and reproducing apparatus for repeatedly recordable and reproducible DVD-RAM discs.

A third object of the present invention is to provide a test apparatus for verifying that DMA information is correctly generated upon initialization without certification in an optical disc recording and reproducing apparatus.

Additional objects and advantages of the invention will be set forth in part in the description which follows and, in part, will be obvious from the description, or may be learned by practice of the invention.

To achieve the above and other objects of the invention, there is provided a method of verifying that DMA information is properly generated in a recording and reproducing apparatus which records or reproduces information on or from an optical disc with DMA information. The method includes generating as test information, defect management information, which is generated after performing initialization without certification on a blank test disc to which no data is written, and verifying the test information using reference test information for the initialization without certification to provide the test result.

To further achieve the above and other objects of the invention, there is also provided an apparatus for testing a recording and reproducing apparatus which records or reproduces information on or from a recordable and reproducible optical disc with DMA information, to check whether the DMA information is properly generated. The apparatus includes a modified drive unit which generates test information from the DMA information of the test disc, which is obtained after the recording and reproducing apparatus performs initialization without certification on a blank test disc to which no data is written; and a verifier which verifies a test result by verifying the test information using reference test information for initialization without certification.

BRIEF DESCRIPTION OF THE DRAWINGS

The above objects and advantages of the present invention will become more apparent by describing in detail preferred embodiments thereof with reference to the attached drawings in which:

FIG. 2 is a table showing check items arranged for verifying a DMA structure upon initialization without certification;

FIG. 3 is a table showing check items arranged for verifying a disc definition structure (DDS) upon initialization without certification;

FIG. 4 is a table showing check items arranged for verifying a primary defect list (PDL) structure upon initialization without certification;

FIG. 5 is a table showing check items arranged for verifying a secondary defect list (SDL) structure upon initialization without certification; and FIG. 6 is a block diagram of a drive to be tested shown in FIG. 1.

DETAILED DESCRIPTION OF THE PREFERRED EMBODIMENTS

Figure 1:
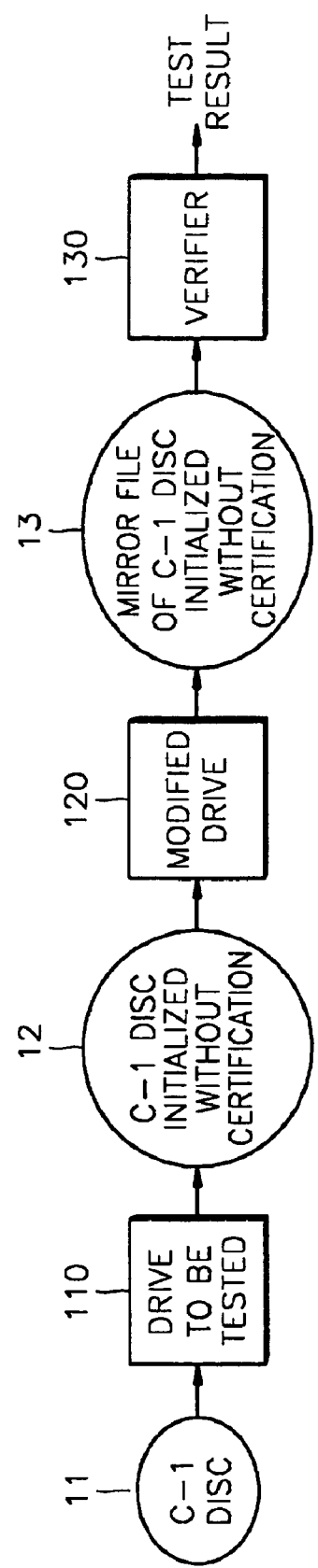
FIG. 1 is a block diagram of a test apparatus for performing a method of verifying defect management area (DMA) information of an optical disc upon initialization without certification according to the present invention.

Reference will now made in detail to the present preferred embodiments of the present invention, examples of which are illustrated in the accompanying drawings. The embodiments are described below in order to explain the present invention by referring to the figures.

An optical disc used in the present invention is a phase change recording DVD-RAM having a capacity of 4.7 gigabytes (GB). DVD-RAMs are defined in the DVD specification for rewritable discs version 2.0.

FIG. 1 is a block diagram of a test apparatus for performing a method of verifying the defect management area (DMA) information of an optical disc upon initialization without certification according to the present invention.

A test type disc (hereinafter, referred to as a C-1 disc) 11 is a disc having only known physical defects which are intentionally made at predetermined positions on a blank disc. However, in the present invention, the test type disc may be treated as a blank test disc to which no data is written. Thus, as long as no "information" is recorded and only physical defects are present on the C-1 disc, the C-1 disc may be regarded as being blank. A drive to be tested 110 performs initialization without certification on the C-1 disc 11 to generate DMA information, and records the generated DMA information on the C-1 disc 11. A C-1 disc initialized without certification 12 is withdrawn from the drive to be tested 110 and is loaded into a modified drive 120, which is capable of reading DMA information.

The modified drive 120 is manufactured exclusively for testing and maybe referred to as a reference drive. The modified drive 120 reads only the DMA information from the C-1 disc initialized without certification 12 and generates a DMA mirror file 50 of the read DMA information for the C-1 disc initialized without certification 12 in a file system. The drive to be tested 110 is realized as, for example, a DVD-RAM recording and reproducing apparatus, and is designed not to generate a mirror file of the DMA information.

When the recording and reproducing architecture of the DVD-RAM recording and reproducing apparatus is divided into a file layer, a host interface layer for interfacing a host computer with the recording and reproducing apparatus, a physical drive layer for recording and reproducing physical signals, and a recording medium layer, since physical sector numbers of a disc are assigned by a recording medium and a physical drive, and logical sector numbers of a disc are assigned by a host interface and a file system, writing and reading of DMA information is performed in the physical drive layer and the layers therebelow.

Generally, when data is recorded on a recording medium in a computer, a recording start position is determined based on a logical sector number assigned by a file system. The file position indicated by a logical sector number is logical and relative position information. When a recording operation is performed in a drive, the logical sector number needs to be converted into a physical sector number indicating a position, at which data is actually recorded on a disc taking into account the physical state such as the state of defects of the disc. However, when user data is actually recorded by the file system, the user data is transmitted to a recording and reproducing apparatus using only the logical sector number, and the recording and reproducing apparatus converts the logical sector number into the physical sector number, which indicates a position at which the data is actually recorded, using defect management information. Accordingly, when defect management information contained in a disc has erroneously been read and written in a given recording and reproducing apparatus, data cannot be exactly read from or written to the disc in another recording and reproducing apparatus.

Moreover, in the case of a DVD-RAM disc, every defect management operation is supposed to be performed by a drive so that the file system or the host interface can record or reproduce a file without using information related to completed physical defect management processes. Accordingly, most of the drives are not provided with a function of recording or reproducing information in or from a DMA, and moreover, are not provided with a standard command for recording or reproducing information in or from the DMA. However, an environment must be prepared in any way such that data can be read by a computer, which can analyze the DMA information, to determine whether the DMA information is properly formed, and it must be possible to record accurate information in a corresponding DMA to make a standard test disc. In order to effectively perform such an operation, a modified drive for recording or reproducing information in or from the DMA is provided. This modified drive can be easily designed or obtained by those skilled in the art, and thus a description thereof will be omitted.

A verifier 130 compares the DMA mirror file 13 for the C-1 disc initialized without certification 12, which is generated by the modified drive 120 from the disc with DMA information generated by the drive to be tested 110, with a reference DMA mirror file for the C-1 disc 11, and informs the manufacturer or user of the result of performing a test to check whether DMA information is properly generated by the drive to be tested 110 after initialization without certification. The reference DMA mirror file is stored in advance or is provided from the outside (a controller for generating a DMA mirror file) although not shown. The DMA mirror file can be referred to as test information, and the reference DMA mirror file can be referred to as predetermined test information. Moreover, the reference DMA mirror file may be referred to as a DMA information file which contains ideal data without errors, which can occur when a drive normally performs an entire operation.

A verification method according to the present invention includes generating as test information, a DMA mirror file from DMA information, which is generated after performing initialization without certification on a blank test disc to which no data is written, and verifying the test information using reference test information for the initialization without certification to provide the test result. The DMA mirror file contains specific information for test purposes as well as all DMA information. The modified drive 120 can write DMA information in a DMA mirror file to a DMA area of a disc, and can save the DMA information of the disc into the DMA mirror file. The test items of the DMA information to be verified upon initialization without certification will be described with reference to FIGS. 2 through 5.

As shown in FIG. 2, the check items for verifying a DMA structure are an error condition of DMA1 through DMA4, DDS/PDL update counters in DDS1 through DDS4 and in SDL1 through SDL4, SDL update counters in SDL1 through SDL4, and contents of DMA1 through DMA4.

The error condition of a DMA item is for checking whether errors exist in DMAs, two of which are located in a lead-in area and two of which are located in a lead-out area. Uncorrectable errors must not exist in any of the four DMAs, DMA1, DMA2, DMA3 and DMA4. If any uncorrectable error is detected in any one of the DMAs, the pertinent verification is determined to be a failure, and a test needs to be retried using a new test disc.

To verify the DDS/PDL and SDL update counter items upon initialization without certification, it is checked whether the values M, which indicate the values of DDS/PDL update counters in four DDSs, i.e., DDS1, DDS2, DDS3 and DDS4, and in four SDLs, i.e., SDL1, SDL2, SDL3 and SDL4, and values k, which indicate increments of the DDS/PDL update counters representing a difference in the DDS/PDL update counters before and after a test, are "0." It is also checked whether the values of the eight DDS/PDL update counters are the same. Here, the value of each DDS/PDL update counter indicates the total number of update and rewrite operations, which are performed on a DDS/PDL block. The value of each DDS/PDL update counter must be set to "0" at the beginning of the initialization, and increased by one when a DDS/PDL block is updated or rewritten. When initialization is completed, the DDS/PDL and SDL blocks must have the same update counter values. Similarly, it is checked whether the values N, which indicate the values of SDL update counters in four SDLs, i.e., SDL1, SDL2, SDL3 and SDL4, and values k, which indicate the increments of the SDL update counters representing a difference in the SDL update counters before and after the test, are "0." It is also checked whether the values of the four SDL update counters are the same.

However, since DMA information is generated only one time in the case of initialization without certification, updating is not performed. Accordingly, the update counter value must to be set to the value "0" that is set when DMA information is first written.

To verify the contents of the DMA, it is checked whether the contents of the four DMAs, i.e., DMA1, DMA2, DMA3 and DMA4, are the same.

As shown in FIG. 3, check items for verifying the DDS in the DMA include a DDS identifier, a disc certification flag, a DDS/PDL update counter, a number of groups, a number of zones, a location of a primary spare area, a location of a first logical sector number (LSN0), and a start LSN for each zone, etc.

It is verified that the DDS identifier is "0A0Ah." It is checked whether the value of the bit position b7, which indicates in-progress/not in-progress, in the one byte of the disc certification flag, is "0b." If the value of the bit position b7 is "0b," this indicates that formatting is complete. If the value of the bit position b7 is "1b," this indicates that formatting is in progress. Accordingly, when the value of the bit position b7 is "1b," this indicates that formatting is a failure. In addition, it is checked whether reserved bit positions b6 through b2 in the disc certification flag are all "0b," and it is checked whether the value of a bit position b1 indicating a user certification flag is "0b." It is also checked whether the value of a bit position b0 indicating a disc manufacturer certification flag is "0b."

To verify the corresponding DDS/PDL update counter, it is checked whether a value M indicating the DDS/PDL update counter value and a value k indicating the increment of the DDS/PDL counter are "0." It is also checked whether the value of the number of groups is "0001h" indicating that the number of groups is 1, and whether the value of the number of zones is "0023h" indicating that the number of zones is 35.

Moreover, it is checked whether the first sector number of a primary spare area is "031000h," and whether the last sector number of the primary spare area is "0341FFh." It is checked whether the location of LSN0 and the start LSN for every zone, that is, the start LSNs of the second zone, Zone1, through the 35th zone, Zone34, are a predetermined logical sector number, which indicates that there is no defect in the case of initialization without certification.

It is checked whether the remaining reserved areas (byte positions 396 to 2047) in the DDS structure are all "00 h."

Additionally, a spare area for defect management on a disc is divided into a primary spare area, a secondary spare area and a supplementary spare area. The primary spare area, which is first assigned when a disc is initialized for replacement of defects, is primarily used for slipping replacement. The remaining spare area can be used as the secondary spare area for linear replacement. The secondary spare area, which is used for linear replacement of defects occurring while a disc is in use, is defined as a spare area, which remains after the primary spare area is used for the slipping replacement during initialization. Alternatively, the secondary spare area may be separately assigned. The supplementary spare area is used for linear replacement of defects occurring while the disc is in use. The supplementary spare area is additionally assigned while the disc is in use after initialization.

When a spare area for linear replacement is lacking during the use of a disc after initialization, a supplementary spare area for linear replacement is assigned in such a manner that the supplementary spare area is gradually increased by a predetermined size in a reverse direction starting from the end of a logical volume area in a file system. The supplementary spare area is also used in the reverse direction starting from the end of the logical volume area during linear replacement.

As shown in FIG. 4, check items for verifying the PDL structure in a DMA include a PDL identifier, a number of entries in PDL, an integrity of the PDL entries and an un-used area.

It is checked whether the PDL identifier is "0001h." In the case of initialization without certification, the number of entries in the PDL is supposed to be "0," and the integrity of the PDL entries is supposed to have no information. Accordingly, it is checked whether "FFh" indicating an un-used area is written in areas for indicating a PDL entry type and a PDL entry.

As shown in FIG. 5, check items for verifying the SDL structure in a DMA include an SDL identifier, an SDL update counter, a start sector number of a secondary spare area (SSA), a total number of logical sectors, a DDS/PDL update counter, a spare area full flag, a number of entries in the SDL, an integrity of the SDL entries, an un-used area, reserved areas, etc.

It is checked whether the SDL identifier is "0002h." It is also checked whether a value N indicating the corresponding SDL update counter value and a value k indicating the increment of the SDL update counter are "0." It is checked whether a value M indicating the corresponding DDS/PDL update counter value and a value k indicating the increment of the SDL update counter are "0."

In case of initialization without certification, it is supposed that the start sector number of the SSA has a value corresponding to the size of a secondary spare area, which is designated by the user during the initialization, and that the total number of logical sectors has a value corresponding to the size of the secondary spare area. It is also supposed that information on the SDL entries does not exist in byte positions which indicate the spare area full flag, the number of entries in the SDL, and the integrity of the SDL entries. Accordingly, the spare area full flag must indicate that the spare area is not full. The value of the number of entries in the SDL must to be "00h." Because the total used area of the SDL is known, if the number of entries in the SDL is checked, the size of the un-used area of the SDL can be determined. Accordingly, it is checked whether the size of the un-used area of the mirror file of the C-1 disc is equal to the size of the un-used area of the SDL, which is known based on the number of entries in the SDL, and also it is checked whether the un-used area is set to "FFh." Also, it is checked whether expected values of all reserved areas are "00h."

FIG. 6 shows the drive to be tested 110 having a light source 22 to emit light, a focusing element 24 to focus the light from the light source on a disc D, and a controller 26 which controls the light source 22. The verification process described above seeks to verify the proper operation of the controller 26.

As described above, the present invention easily verifies that a recording and reproducing apparatus properly translates and processes DMA information which is generated after initialization without certification, using a blank test disc to which no data is written.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of verifying whether a recording and reproducing apparatus reads and processes defect management area (DMA) information properly, comprising;
    performing initialization without certification on a test disc containing predetermined known physical defect information, to generate the DMA information as test information; and
    comparing the test information with reference test information to determine a verification of the recording and reproducing apparatus.

2. The method of claim 1, wherein the comparing the test information with reference test information comprises:
    comparing a structure of the generated DMA information of the test information with a structure of DMA information of the reference test information;
    comparing a disc definition structure (DDS) in the DMA information of the test information with a structure of a DDS in the DMA information of the reference test information;
    comparing a primary defect list (PDL) structure in the DMA information of the test information with a structure of a PDL in the DMA information of the reference test information; and
    comparing a secondary defect list (SDL) structure in the DMA of the test information with a structure of an SDL in the DMA information of the reference test information.

3. The method of claim 2, wherein the comparing the DMA structures comprises checking an error condition, DDS/PDL and SDL update counters and contents of the generated DMA information and/or the DMA information of the reference test information.

4. The method of claim 3, wherein:
    the checking of the error condition comprises checking whether errors exist in any one of four DMAs, which is the DMA written in four positions on the test disc, two of which are located in a lead-in area and two of which are located in a lead-out area on the test disc;
    the checking of the DDS/PDL update counters comprises checking whether values of the DDS/PDL update counters in four DDSs and in four SDLs and increments of the eight DDS/PDL update counters representing a difference in the DDS/PDL update counters before and after the performing of the initialization without certification are all "0," and checking whether the values of the eight DDS/PDL update counters are the same;
    the checking of the SDL update counters comprises checking whether values of the SDL update counters in the four SDLs and increments of the four SDL update counters representing a difference in the SDL update counters before and after the performing of the initialization without certification are all "0" and checking whether the values of the four SDL update counters are the same; and
    the checking of the contents of the DMA comprises checking whether the contents of the four DMAs are the same.

5. The method of claim 2, wherein the comparing of the DDS comprises checking a DDS identifier, a disc certification flag, a DDS/PDL update counter, a number of groups, a number of zones, a location of a primary spare area, a location of a first logical sector number and a start logical sector number for each zone, or combinations thereof within the generated DMA information and/or the DMA information of the reference test information.

6. The method of claim 2, wherein the comparing of the PDL structure comprises checking a PDL identifier, a number of entries in the PDL and an integrity of the PDL entries within the generated DMA information and/or the DMA information of the reference test information.

7. The method of claim 6, wherein:
    the checking of the PDL identifier comprises checking whether the PDL identifier is a predetermined value;
    the checking of the number of entries comprises checking whether the number of entries in the PDL is set to "0;" and
    the checking of the integrity of the PDL comprises checking whether the PDL entries do not exist.

8. The method of claim 2, wherein the comparing of the SDL structure comprises checking an SDL identifier, an SDL update counter, a start sector number of a secondary spare area (SSA), a total number of logical sectors, a DDS/PDL update counter, a spare area full flag, a number of entries in the SDL, an integrity of the SOL entries, an un-used area, and reserved areas, or combinations thereof within the generated DMA information and/or the DMA information of the reference test information.

9. The method of claim 8, wherein:
    the checking of the SDL identifier comprises checking whether the SDL identifier is a predetermined value;
    the checking of the SDL update counter comprises checking whether the SDL update counter value and an increment of the SDL update counter representing a difference in the SDL update counter before and after the performing of the initialization without certification are "0;"
    the checking of the DDS/PDL update counter comprises checking whether the DDS/PDL update counter value and an increment of the DDS/PDL update counter representing a difference in the DDS/PDL update counter before and after the performing of the initialization without certification are "0"
    the checking of the start sector number of the SSA, the total number of logical sectors, the spare area full flag, the number of the entries of the SDL, and the integrity of the SDL entries comprises checking whether the start sector number of the SSA and the total number of logical sectors are correctly set to values designated during the initialization, whether the spare area full flag is not full, whether the number of entries in the SDL is "00h," and whether information on the SDL entries do not exist, respectively; and
    the checking of the un-used area and the reserved areas comprises checking a size of the un-used area of the SDL and whether the un-used area is a predetermined value, and whether the reserved areas are predetermined values.

10. The method of claim 1, wherein the test disc used by the recording and reproducing apparatus is a digital versatile disc-random access memory (DVD-RAM).

11. The method of claim 1, wherein the reference test information is a reference DMA mirror file.

12. The method of claim 11, wherein the reference DMA mirror file contains ideal data without errors.

13. A method of verifying whether a recording and reproducing apparatus reads and processes defect management area (DMA) information properly, comprising:
performing initialization without certification on a test disc containing predetermined known physical defect information, to generate test information; and
comparing the test information with reference test information to determine a verification of the recording and reproducing apparatus,
wherein
the performing of the initialization without certification comprises:
having the recording and reproducing apparatus perform the initialization without certification on the test disc, to generate a disc with the DMA information, and
reading only the DMA information from the disc using a reference drive, to generate a DMA mirror file as the test information, and
the reference test information is a reference DMA mirror file.

14. A method of verifying whether a recording and reproducing apparatus reads and processes defect management area (DMA) information properly, comprising:
performing initialization without certification on a test disc containing predetermined known physical defect information, to generate test information; and
comparing the test information with reference test information to determine a verification of the recording and reproducing apparatus,
wherein the comparing comprises checking a structure of a DMA, a disc definition structure (DDS) of the DMA, a primary defect list (PDL) structure and a secondary list (SDL) structure of the DMA, which form the test information.

15. A method of verifying whether a recording and reproducing apparatus reads and processes defect management area (DMA) information properly, comprising:
performing initialization without certification on a test disc using the reproducing and recording apparatus to generate the DMA information, the test disc containing predetermined known physical defects;
generating test information from the generated DMA information; and
comparing the test information with reference test information to determine a verification of the recording and reproducing apparatus.

16. The method of claim 15, wherein the comparing comprises:
checking a structure of a DMA, a disc definition structure (DDS) of the DMA, a primary defect list (PDL) structure and a secondary list (SDL) structure of the DMA, which form the test information.

17. The method of claim 15, wherein the performing the initialization without certification on the test disc comprises the reproducing and recording apparatus generating the DMA information using the test disc containing the predetermined known physical defects.

18. The method of claim 15, wherein the test information is a DMA mirror file and the reference test information is a reference DMA mirror file.

19. The method of claim 15, wherein the comparing the test information with reference test information comprises: checking a structure of a DMA, a disc definition structure (DDS) of the DMA, a primary defect list (PDL) structure a secondary list (SDL) structure of the generated DMA information in the generated test information and/or a DMA information of the reference test information.

20. A method of verifying whether Defect Management Area (DMA) information is properly generated by a recording and reproducing apparatus, the method comprising:
performing initialization without certification on a test disc such that the reproducing and recording apparatus generates the DMA information;
generating test information from the generated DMA information; and
comparing the test information with reference test information to determine a verification of the recording and reproducing apparatus.

21. The method of claim 20, wherein:
the DMA information comprises a structure of the DMA, a disc definition structure (DDS) of the DMA, a primary defect list (PDL) and a secondary list (SDL) structure of the DMA, and
the comparing comprises: checking the structure of the DMA, the disc definition structure (DDS) of the DMA, the primary defect list (PDL) structure and the secondary list structure (SDL) of the DMA, which form the test information.

* * * * *

UNITED STATES PATENT AND TRADEMARK OFFICE
CERTIFICATE OF CORRECTION

PATENT NO. : 7,409,599 B2  Page 1 of 1
APPLICATION NO. : 10/792744
DATED : August 5, 2008
INVENTOR(S) : Jung-wan Ko et al.

It is certified that error appears in the above-identified patent and that said Letters Patent is hereby corrected as shown below:

Column 8, line 37, change "SOL" to --SDL--.

Signed and Sealed this

Thirtieth Day of September, 2008

JON W. DUDAS
*Director of the United States Patent and Trademark Office*